(12) United States Patent
Kim

(10) Patent No.: US 9,313,550 B2
(45) Date of Patent: Apr. 12, 2016

(54) METHOD FOR PROVIDING CONTENT MANAGEMENT LIST AND APPARATUS FOR PERFORMING SAME

(75) Inventor: Dong Ho Kim, Seoul (KR)

(73) Assignee: Humax Co., Ltd., Seongnam-si (KR)

( * ) Notice: Subject to any disclaimer, the term of this patent is extended or adjusted under 35 U.S.C. 154(b) by 0 days.

(21) Appl. No.: 13/985,688

(22) PCT Filed: Feb. 3, 2012

(86) PCT No.: PCT/KR2012/000670
§ 371 (c)(1),
(2), (4) Date: Aug. 15, 2013

(87) PCT Pub. No.: WO2012/111924
PCT Pub. Date: Aug. 23, 2012

(65) Prior Publication Data
US 2013/0326556 A1    Dec. 5, 2013

(30) Foreign Application Priority Data
Feb. 16, 2011 (KR) .................. 10-2011-0013798

(51) Int. Cl.
| | |
|---|---|
| G06F 3/00 | (2006.01) |
| G06F 13/00 | (2006.01) |
| H04N 5/445 | (2011.01) |
| H04N 21/482 | (2011.01) |
| H04N 21/432 | (2011.01) |
| H04N 21/436 | (2011.01) |

(Continued)

(52) U.S. Cl.
CPC ......... *H04N 21/482* (2013.01); *H04N 21/4325* (2013.01); *H04N 21/43615* (2013.01); *H04N 21/4622* (2013.01); *H04N 21/47214* (2013.01); *H04N 21/4821* (2013.01); *H04N 21/4826* (2013.01); *H04N 21/6125* (2013.01); *H04N 21/4334* (2013.01)

(58) Field of Classification Search
USPC ........................................ 725/37–40, 43, 44
See application file for complete search history.

(56) References Cited

U.S. PATENT DOCUMENTS

| | | | | |
|---|---|---|---|---|
| 6,601,237 | B1 * | 7/2003 | Ten Kate et al. ................. | 725/47 |
| 2002/0188947 | A1 * | 12/2002 | Wang et al. ..................... | 725/45 |

(Continued)

FOREIGN PATENT DOCUMENTS

| | | |
|---|---|---|
| JP | 11-196343 A | 7/1999 |
| JP | 2005-191944 A | 7/2005 |

(Continued)

*Primary Examiner* — Yassin Alata
(74) *Attorney, Agent, or Firm* — Birch, Stewart, Kolasch & Birch, LLP

(57) ABSTRACT

Disclosed are a method for providing a content management list which enables integrated management for the use of various contents and an apparatus for performing the same. The method for providing the content management list in a content management list provision apparatus which can be connected to a plurality of contents through a network includes the steps of: displaying the content management list including electronic program guide information of a broadcasting program; and displaying information of reserved playback contents corresponding to the reservation time of a time axis which is additionally displayed in the content management list according to an event signal for indicating a content playback reservation. Accordingly, the method enables a user to easily determine the reserved states of all available contents, and enables the user to efficiently make plans to use the various contents therethrough.

15 Claims, 6 Drawing Sheets

(51) Int. Cl.
*H04N 21/472* (2011.01)
*H04N 21/462* (2011.01)
*H04N 21/61* (2011.01)
*H04N 21/433* (2011.01)

(56) References Cited

U.S. PATENT DOCUMENTS

2003/0159145 A1    8/2003  Kaltz
2004/0117853 A1*   6/2004  Karaoguz et al. ............. 725/134
2009/0119712 A1    5/2009  Kim et al.
2010/0158476 A1*   6/2010  Hao et al. ........................ 386/83
2010/0333137 A1   12/2010  Hamano et al.

FOREIGN PATENT DOCUMENTS

JP      2008-060960 A      3/2008
KR    10-2005-0056612 A    6/2005

* cited by examiner

US 9,313,550 B2

METHOD FOR PROVIDING CONTENT MANAGEMENT LIST AND APPARATUS FOR PERFORMING SAME

TECHNICAL FIELD

The present invention concerns content management, and more specifically, to a method of providing a content management list, which may provide an integrated reservation list of various contents connected through a wired/wireless network or an electronic program guide, and an apparatus of performing the method.

BACKGROUND ART

Guidelines that should be observed for interoperability between various devices in a home/office have been established, the DLNA (Digital Living Network Alliance) standardization for authenticating whether the guidelines are observed has been in progress. The DLNA provides for interoperability between a diversity of devices such as digital AV devices or personal computers which are connected to one another over a home network, so that content including music, videos or still images may be shared between the devices in the home network.

DLNA-authenticated devices in a home network would be at interoperability over a wired/wireless network. In other words, the DLNA enables home appliances, PCs, wireless devices, or other digital devices to be connected to one another via a wired/wireless home network based on UPnP (Universal Plug and Play), so that the devices may share content.

Such nature of the DLNA enables DLNA-authenticated terminals to share content. In order to search for content stored in one or more DLNA-authenticated terminals having a storage area, a character-based inquiry word is transmitted to the terminals, and each terminal looks up content similar to the inquiry word and shares the corresponding content with the other DLNA-authenticated devices via the home network.

Meanwhile, as a type of digital convergence, IPTV that may provide various types of content such as information, video, music, or broadcast through a high-speed Internet network, has been commercialized. A user may watch only programs he desires to at his convenient time, may directly play back content stored in his various portable terminals, e.g., a smartphone, or may replay audios or videos streamed from a server over the Internet.

As described above, the amount of content users may access has been drastically increased, and content happened to be shared between devices via DLNA so that content may be played back by the devices no matter what devices they are. Accordingly, users need more convenient and efficient content management.

Presently, as a representative application, which provides information on digital broadcast programs while enabling broadcast programs to be viewed or reserved for recording, the EPG (Electronic Program Guide) is used. The EPG information includes information for guiding various programs that are to be on air via IPTV or cable broadcast or digital terrestrial broadcast and provides for the functions of helping viewers to choose programs or of displaying information on the programs selected or reserved by users.

However, the conventional EPG is dedicated to digital terrestrial broadcast, IPTV or cable TV broadcast services, and thus, only provides per-channel broadcast information of the terrestrial broadcast, cable TV or IPTV. Thus, replay, recording, or reserved viewing of various types of content connected via DLNA or wired/wireless network might not be managed by the EPG. Accordingly, content provided through digital terrestrial broadcast or IPTV or cable TV services is managed by the EPG provided by the corresponding service while other various types of content need to be separately managed for replay, recording, or reservation, thus resulting in users' inconvenience.

DISCLOSURE

Technical Problem

To address the above-described disadvantages, an object of the present invention is to provide a method of providing a content management list, by which various types of content may be integrally managed when used.

Further, another object of the present invention is to provide an apparatus of providing a content management list, by which various types of content may be integrally managed when used.

The present invention is not limited to the foregoing objects, and other objects may be apparently understood by one of ordinary skill in the art from the detailed description that follows.

Technical Solution

To achieve the above objects of the present invention, according to an aspect of the present invention, a method of providing a content management list of a content management list providing apparatus that may access a plurality of contents through a network, the method comprising displaying a content management list including electronic program guide information of a broadcast program and displaying information of a playback reservation content corresponding to an event signal indicating a content playback reservation at a corresponding reservation time of a time axis separately displayed on the content management list. Here, displaying the information of playback reservation content at the corresponding reservation time of the time axis separately displayed on the content management list comprises obtaining the information of playback reservation content corresponding to the event signal indicating the content playback reservation and displaying the obtained information of playback reservation content at the reservation time. Here, the information of playback reservation content includes at least one of a file name, a file location, a file size, a playback time, and a file type.

Displaying the information of playback reservation content at the corresponding time of the time axis separately displayed on the content management list comprises selecting a predetermined content by a user and providing a user interface that enables the user to arbitrarily select a playback section of a whole playback section of the selected predetermined content and obtaining information on the playback section selected by the use and displaying the obtained information at the corresponding time. The content management list, in case there are a plurality of playback-reserved contents, separates each of a plurality of playback-reserved contents into each type, displays each separated content type as a separate time axis item having the same form as the electronic program guide, and then displaying corresponding content reservation information at a corresponding reservation time of each time axis item.

Here, displaying the information of playback reservation content corresponding to the event signal indicating the content playback reservation at the corresponding reservation time of the time axis separately displayed on the content management list comprises generating a content recommendation list based on searching at least one content that may be played back at the reservation time corresponding to the event signal indicating the content playback reservation, displaying the generated content recommendation list, and displaying information of the predetermined playback reservation content selected by the user in the displayed content recommendation list at the corresponding reservation time of the time axis separately displayed on the content management list.

Here, generating the content recommendation list comprises searching at least one content based on at least one of a content playback time, a user's content use history, and a user's content preference and aligning the searched at least one content according to a predetermined standard. Here, the content management list displays playback reservation information on at least one content of a content stored in the content management list providing apparatus, a content stored in each of at least one apparatuses connected to the content management list providing apparatus via a network, a content connected through a DLNA, and a content that may be played through the Internet.

To achieve the above objects of the present invention, according to another aspect of the present invention, an apparatus of providing a content management list, the apparatus comprising a communication unit receiving electronic program guide information and information of content via a wired or wireless network, an input unit providing an event signal corresponding to a key control signal provided by a user's key manipulation, a controller displaying a content management list including the electronic program guide information and displaying information of a playback reservation content corresponding to an event signal indicating a content playback reservation provided from the input unit at a corresponding reservation time of a time axis separately displayed on the content management list, and an output unit outputting display information of the content management list under control of the controller.

Advantageous Effects

According to the above-described method of providing a content management list and apparatus of performing the method, among content stored in each device through a wired or wireless network content shared by DLNA, and content that may be played back over the Internet, as well as the electronic program guide information for digital terrestrial broadcast, IPTV or cable TV broadcast programs, information of content viewed, played back, or recording-reserved by a user may be integrally and simultaneously displayed.

Accordingly, a user may easily grasp the reservation situation of all the available content, and thus, the user may more efficiently make a plan for use of various types of content.

BEST MODE

Various modifications may be made to the present invention and the present invention may have a number of embodiments. Specific embodiments are described in detail with reference to the drawings.

However, the present invention is not limited to specific embodiments, and it should be understood that the present invention includes all modifications, equivalents, or replacements that are included in the spirit and technical scope of the present invention.

The terms "first" and "second" may be used to describe various components, but the components are not limited thereto. These terms are used only to distinguish one component from another. For example, the first component may be also named the second component, and the second component may be similarly named the first component. The term "and/or" includes a combination of a plurality of related items as described herein or any one of the plurality of related items.

When a component is "connected" or "coupled" to another component, the component may be directly connected or coupled to the other component. In contrast, when a component is directly connected or coupled to another component, no component intervenes.

The terms used herein are given to describe the embodiments but not intended to limit the present invention. A singular term includes a plural term unless otherwise stated. As used herein, the terms "include" or "have" are used to indicate that there are features, numerals, steps, operations, components, parts or combinations thereof as described herein, but do not exclude the presence or possibility of addition of one or more features, numerals, steps, operations, components, parts or components thereof.

Unless defined otherwise, all the terms including technical or scientific terms as used herein have the same meanings as those generally understood by one of ordinary skill in the art. Such terms as generally defined in the dictionary should be interpreted as having meanings consistent with those understood in the context of the related technologies, and should not be construed as having excessively formal or ideal meanings unless clearly defined in the instant application.

Hereinafter, preferred embodiments of the present invention will be described in detail with reference to the accompanying drawings. For better understanding of the entire invention, the same references are used to denote the same elements throughout the drawings, and description thereof is not repeated.

Figure 1:
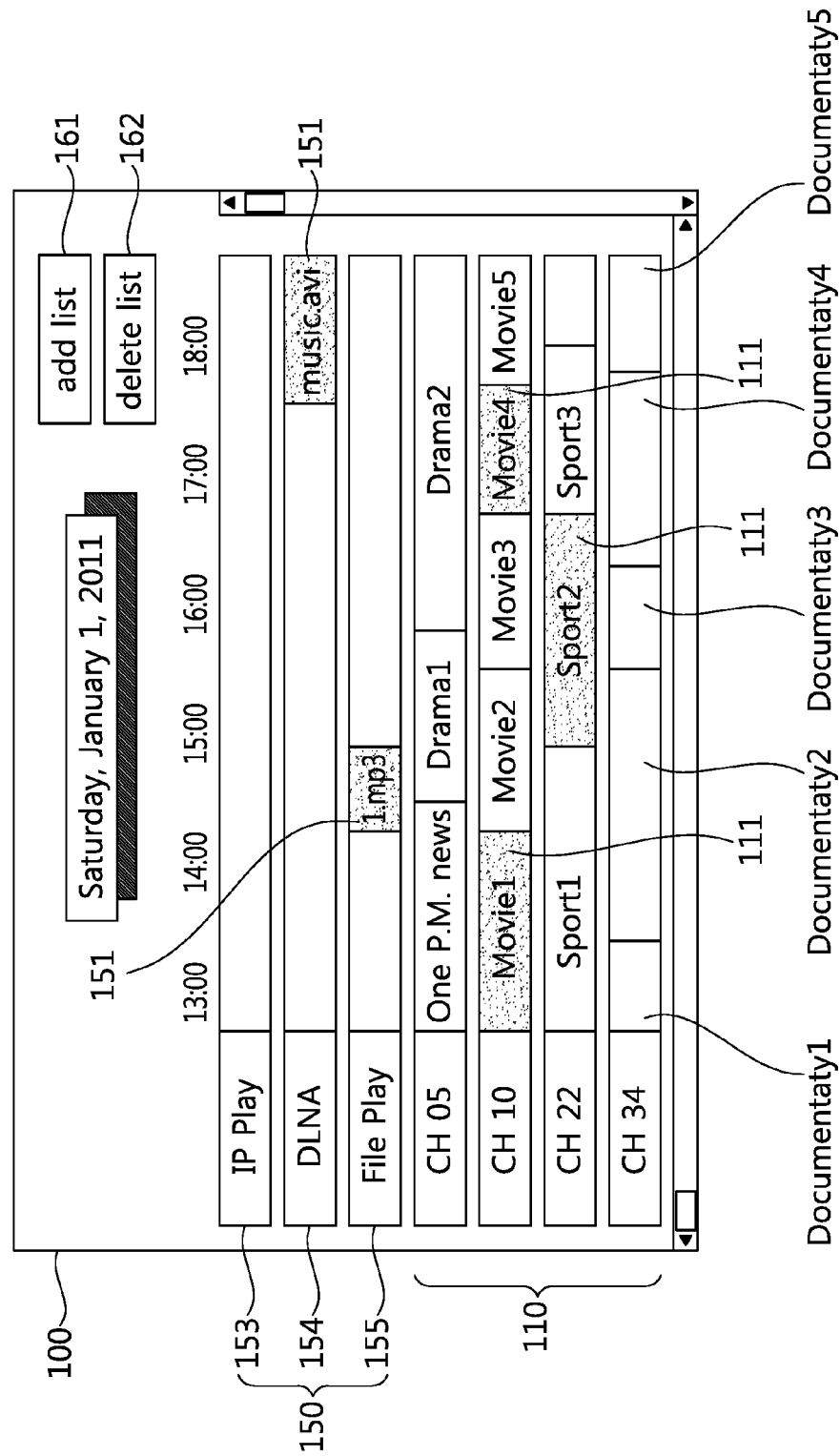
FIG. 1 is a conceptual view illustrating the configuration of a content management list according to an embodiment of the present invention.

FIG. 1 is a conceptual view illustrating the configuration of a content management list according to an embodiment of the present invention.

Referring to FIG. 1, the content management list 100 according to an embodiment of the present invention collectively displays per-channel program information of multi-channel digital broadcast provided through IPTV or digital terrestrial broadcast, program information 110 viewed or recording-reserved by a user, and playback reservation information 150 of various types of content connected via a wired/wireless network.

Specifically, the content management list 100 displays per-time broadcast information 100 for each of a plurality of channels provided through digital terrestrial broadcast, IPTV or cable TV separately from specific program information viewed or recording-reserved by the user (e.g., program title). For example, as shown in FIG. 1, the content management list 100 display the specific program information 111 viewed or recording-reserved by the user so that the specific program information 111 is distinguished from other program information by graphic and/or text.

Further, the content management list 100 displays information of content 151 viewed or recording-reserved by a user among content (File) stored in a content management list providing apparatus or stored in local areas of various apparatuses connected wiredly or wirelessly to the content management list providing apparatus, content (DLNA) shared based on DLNA, and content (IP Play) connected via the Internet or content that may be plaid back.

Here, among the content (File) stored in the local areas, content (DLNA) shared based on DLNA, and content (IP Play) connected via the Internet or that may be played back, the information of content played back or recording-reserved by the user may be separated into types of content, and the separated content types may be displayed using time-axis items 153, 154, and 155, respectively, and may be displayed such that the content types may be distinguished from other program information at a time reserved by the user.

That is, as shown in FIG. 1, the content management list 100 according to an embodiment of the present invention displays the content (File) stored in the local areas of various apparatuses connected to one another via a network, content (DLNA) shared based on DLNA, and content (IP Play) connected via the Internet or that may be played back with respective separate time axes 153, 154, and 155 and displays reservation information 151 at a time reserved by the user. Here, the reservation information displayed on the content management list 100 may include at least one of file name, file location, file size, and/or playback time of corresponding content.

Further, the content management list 100 may include a command tool 161 that may include playback, view, or recording reservation of a predetermined program and a command tool 162 that may delete or cancel what has been already reserved, and in case the screen overflows with information displayed on the content management list 100, a vertical and/or horizontal scroll tool may be automatically displayed.

As shown in FIG. 1, the content management list 100 according to an embodiment of the present invention may integrally and simultaneously display information of content 150 viewed, played back or recording reserved by a user among content stored in the local area of each device through a wired or wireless network, content shared based on DLNA, and content that may be played back through the Internet, as well as the digital terrestrial broadcast, IPTV, and cable TV broadcast program information 110, so that a user may easily grasp the reservation status of all the content. Thus, the user may establish a plan of using various types of content and use the content in a more efficient manner.

Figure 2:
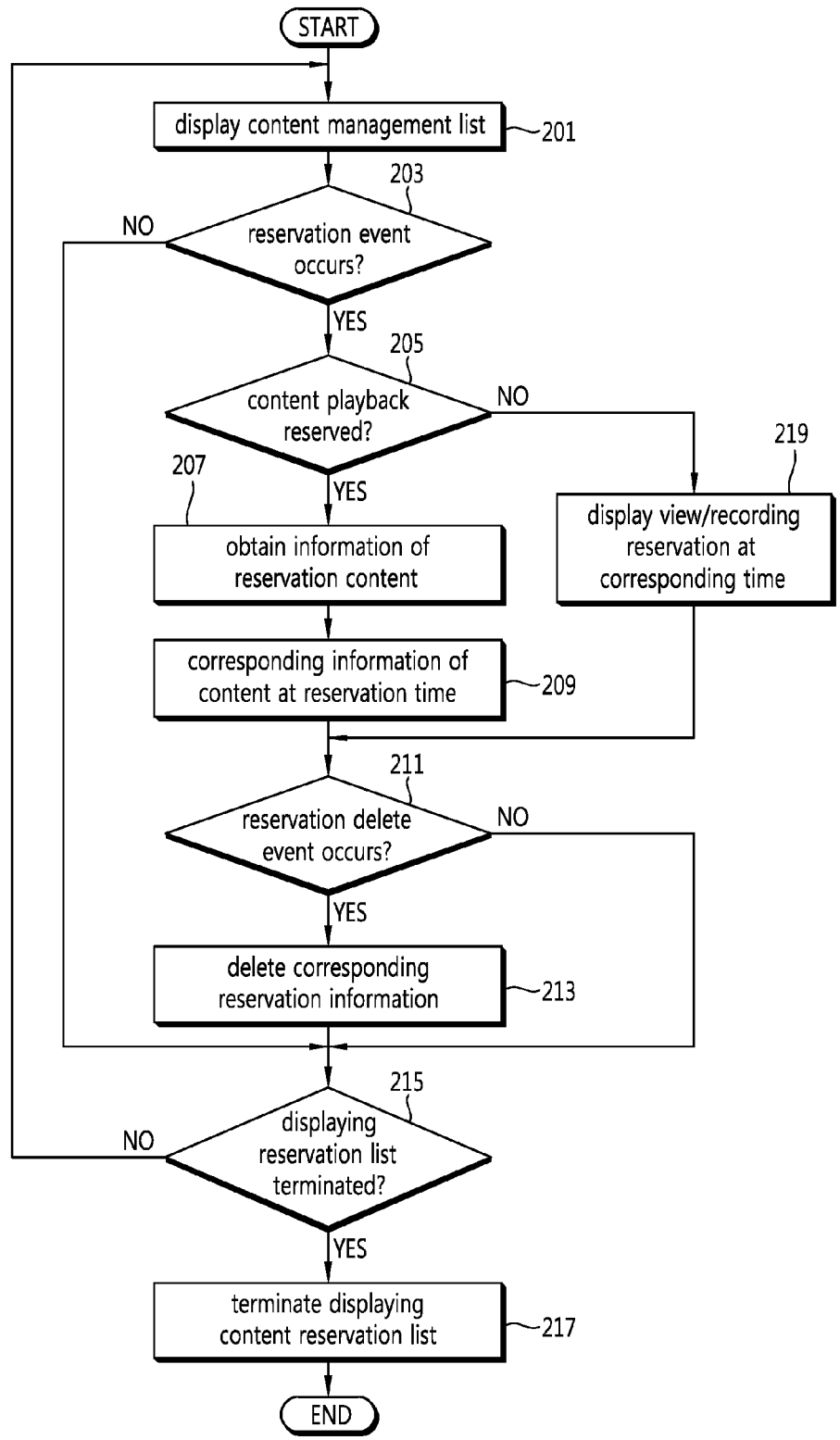
FIG. 2 is a flowchart illustrating a method of providing a content management list according to an embodiment of the present invention.
Figure 3:
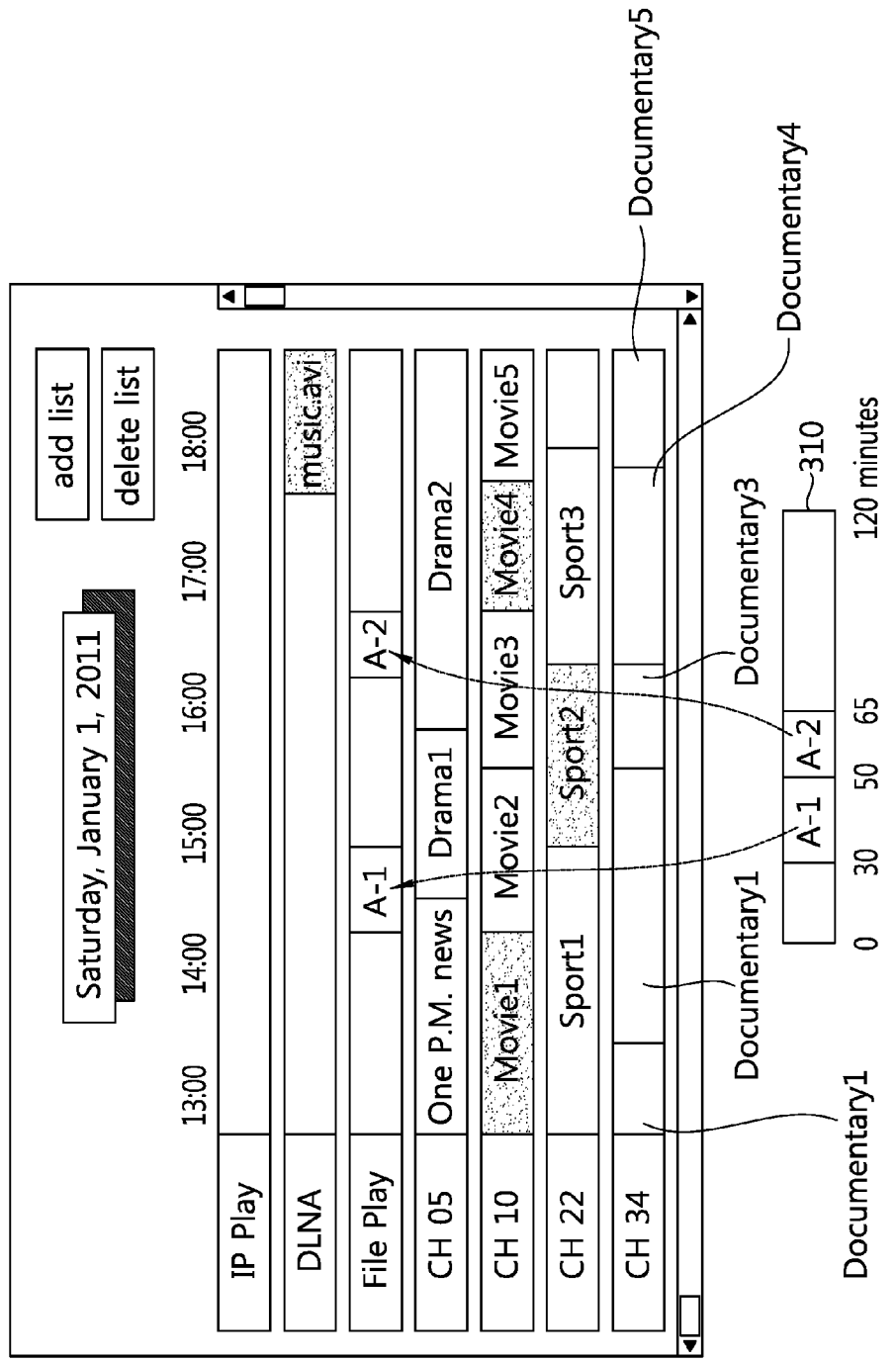
FIG. 3 is a conceptual view illustrating a process of reserving playback of the content shown in FIG. 2.

FIG. 2 is a flowchart illustrating a method of providing a content management list according to an embodiment of the present invention, and FIG. 3 is a conceptual view illustrating a process of reserving playback of the content shown in FIG. 2.

A method of providing a content management list according to an embodiment of the present invention is described with reference to FIGS. 2 and 3. First, a content management list providing apparatus obtains electronic program guide (EPG) of a digital terrestrial broadcast, an IPTV broadcast, or a cable TV broadcast received through a wired or wireless network, and accordingly, displays a content management list including the obtained electronic program guide information (step 201).

Thereafter, the content management list providing apparatus determines whether a reservation event for reserving view/recording or playback of predetermined content of a broadcast program occurs (step 203), and if it is determined that the reservation event occurs, determines whether the reservation event is a reservation event for content playback or reservation event for viewing a broadcast program (step 205). Here, the reservation event for viewing a broadcast program means an event for reserving playback of content stored in the storage of a content management list providing apparatus or content stored in various apparatuses connected to the content management list providing apparatus via network apart from a reservation for viewing or recording a digital terrestrial broadcast, IPTV broadcast or cable TV broadcast program, content connected through DLNA or content connected via the Internet or content that may be played back. Further, the reservation event may be generated by a user manipulating a manipulation key provided in the content management list providing apparatus or a corresponding key of a remote controller.

If it is determined in step 205 that the reservation event is for the purpose of content playback, the content management list providing apparatus obtains information of reservation content selected by a user (step 207). Here, the information of reservation content may include the file name, file location, file size, playback time, and file type of the corresponding content. Further, the content management list providing apparatus may provide a user interface that enables a user to select predetermined content and to select any section of the whole playback section of the predetermined content to reserve playback, and in such case, the information of reservation content may further include information on playback start and/or playback end of the reservation content arbitrarily selected by the user from the whole playback section of the content.

Thereafter, the content management list providing apparatus displays the obtained information of reservation content at a corresponding time selected by a user (step 209). Here, the content management list providing apparatus, as shown in FIG. 1, may display content according to its type using a separate time axis item, and in such a way that it may be distinguished from other program information at a corresponding time reserved by the user. For example, in case a user reserves the 'music.avi' file shared through DLNA at 18:00, the content management list providing apparatus, as shown in FIG. 1, configures DLNA with a separate time axis and then displays information of content (e.g., music.avi) at a corresponding time of the time axis.

Or, in case a user splits predetermined content and selects to reserve playback from any time of the whole playback section of the predetermined content, playback reservation information of the split content is displayed on a corresponding section of the content management list.

For example, as shown in FIG. 3, in case a user selects predetermined content 310 to be playback-reserved during sections 'A-1' and 'A-2' from the content playback list, and a specific playback section of the selected content 320 is arbitrarily selected and thus playback is reserved, the content management list providing apparatus displays the split playback section information of the predetermined content designated by the user on a corresponding section of the content playback list. Here, the content playback list providing apparatus, if a user designates a playback start section of the whole playback section of the predetermined content, may be configured to automatically set up an end section of the predetermined content corresponding to the width of a reservable time of the content playback list, and may be configured for a user to arbitrarily designate a start time and an end time of the playback reservation section of the predetermined content.

As shown in FIG. 3, in case a user selects predetermined content 310 to be reserved during section 'A-1' from the content playback list and designates the playback reservation start time as 30 minutes of the whole playback section of the predetermined content 310, the content playback list providing apparatus identifies the length of the 'A-1' section, and if the length of the 'A-1' section is 20 minutes, may automatically designate the playback reservation end time of the predetermined content 310 as 50 minutes. Or, the user may identify the length of the 'A-1' section and then directly designate the start time and end time of the playback reservation section of the whole playback section.

Thereafter, the content management list providing apparatus determines whether an event occurs indicating that an already reserved broadcast program or content is reservation-canceled (or deleted) (step 211), and if the reservation cancellation event is determined to occur, deletes the corresponding reservation information from the content management list (step 213).

Further, the content management list providing apparatus determines whether an event occurs indicating to terminate displaying the currently displayed content management list (step 215), and if the event to indicate termination of the display of the content management list is determined to occur, ends displaying the content management list (step 217).

If it is determined in step 205 of FIG. 2 that the reservation event is not for the purpose of playback of content (that is, for the purpose of viewing/recording-reserving a broadcast program), the content management list providing apparatus displays viewing or recording-reserving a broadcast program at a time selected by a user (step 219) and goes to step 211 to perform a subsequent step.

Although in the content management list providing method according to an embodiment of the present invention as described in FIG. 2, an electronic content management list is first displayed in response to a user's command, and a reservation for a broadcast program or content selected by the user is displayed on the content management list, the user first selects predetermined content without displaying the content management list and then displays the content management list at the time that a reservation for the selected content is ordered, and content may be indicated as reserved at a corresponding time selected by the user.

Figure 4:
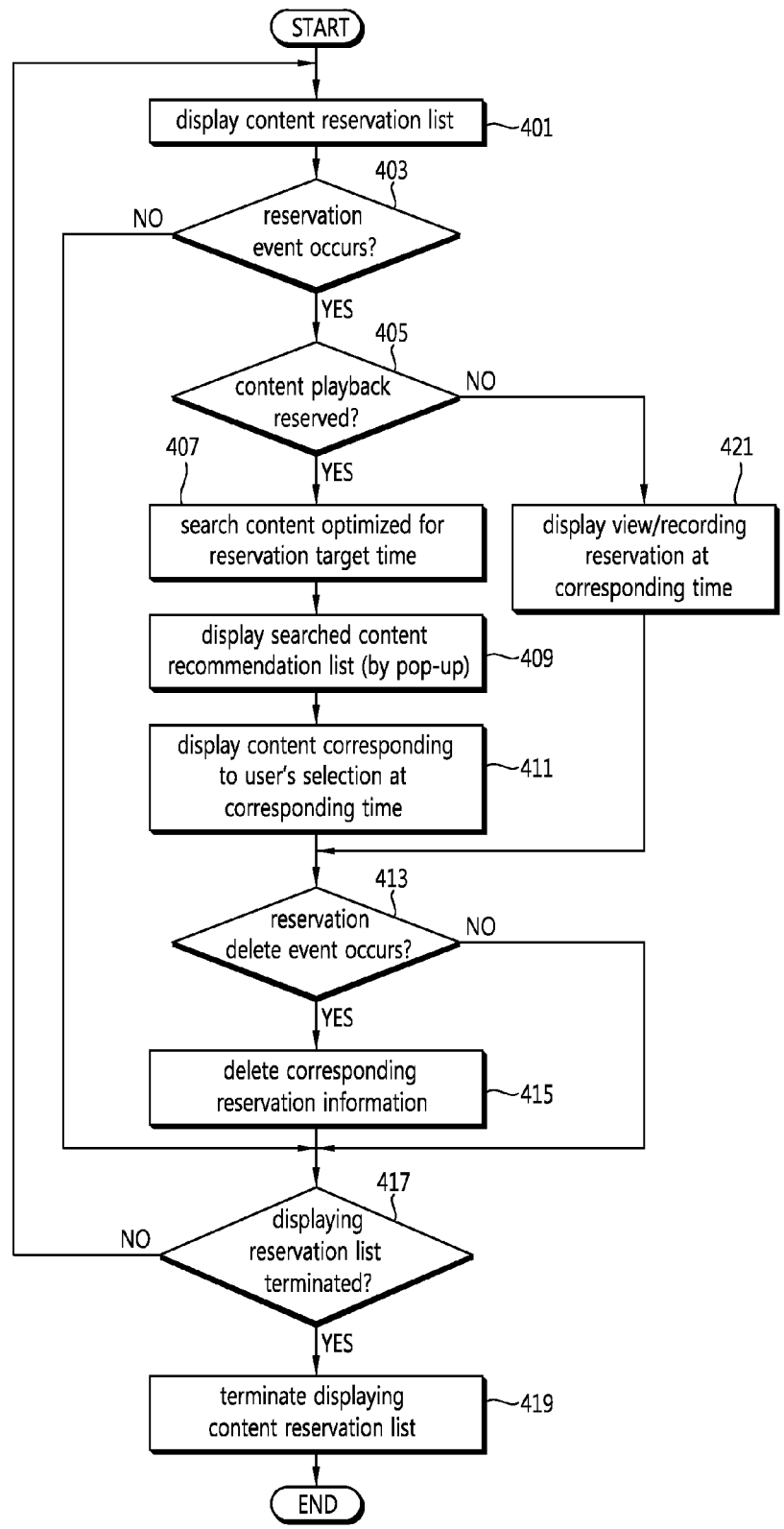
FIG. 4 is a flowchart illustrating a method of providing a content management list according to another embodiment of the present invention.
Figure 5:
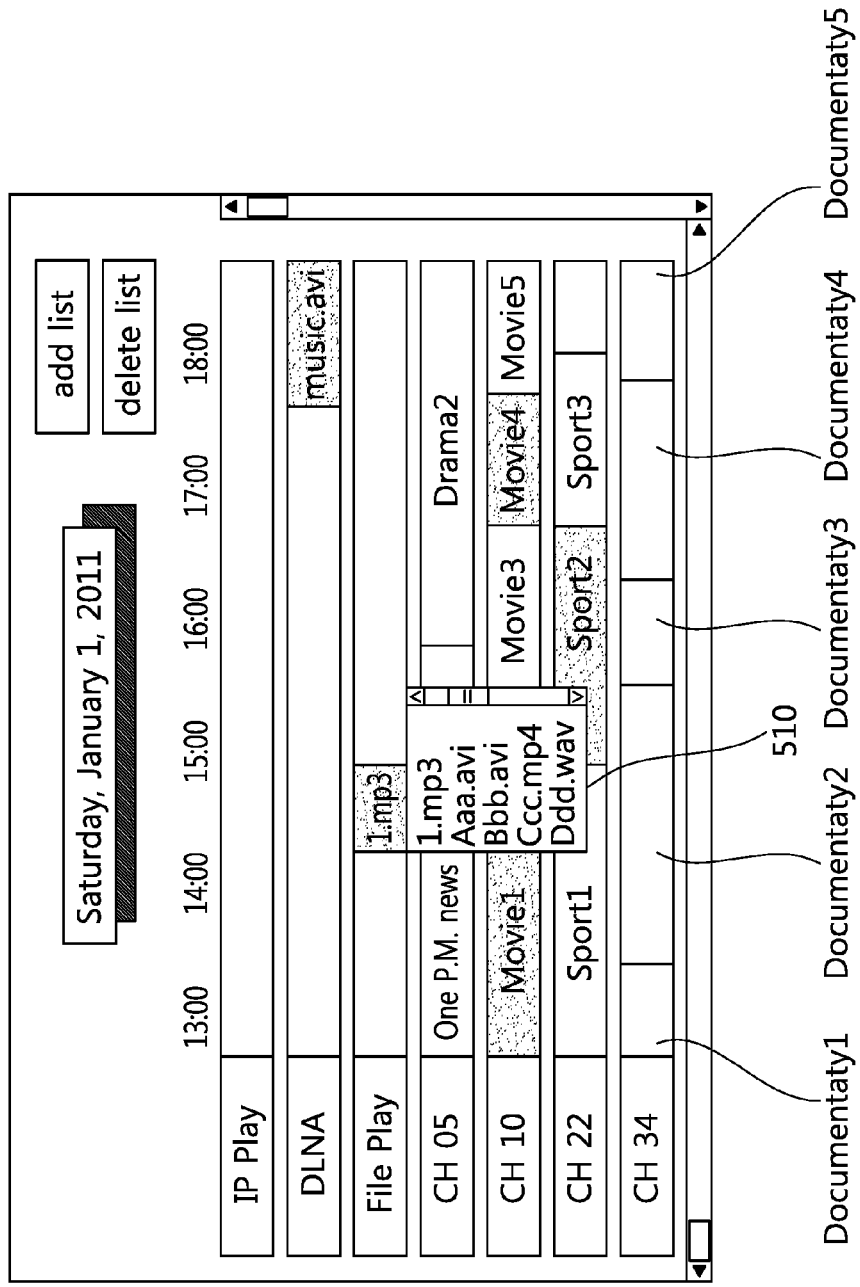
FIG. 5 is a conceptual view illustrating the process of recommending a content recommendation list as shown in FIG. 4.

FIG. 4 is a flowchart illustrating a method of providing a content management list according to another embodiment of the present invention. FIG. 5 is a conceptual view illustrating the process of recommending a content recommendation list as shown in FIG. 4.

Referring to FIGS. 4 and 5, a method of providing a content management list is described. First, the content management list providing apparatus obtains electronic program guide information of digital terrestrial broadcast, IPTV broadcast or cable TV broadcast received through a wired or wireless network, and displays a content management list including the obtained electronic program guide information in accordance with a user's manipulation (step 401).

Thereafter, the content management list providing apparatus determines whether a reservation event occurs for viewing/recording a broadcast program or reserving playback of predetermined content (step 403), and if the reservation event is determined to occur, determines whether the reservation event is for the purpose of content playback or for the purpose of viewing a broadcast program (step 405).

If it is determined in step 405 that the reservation event is for the purpose of content playback, the content management list providing apparatus searches content to recommend content optimized at the reservation target time (step 407) and displays a searched content recommendation list in a pop-up window (step 409).

Specifically, the content management list providing apparatus, when a user provides a command indicating a content reservation at a specific time, searches content optimized at the specific time from various routes (e.g., content shared by DLNA, and apparatuses connected via the Internet or wired/wireless networks) in consideration of content playback time, user's content use history, or user's content preference.

For example, as shown in FIG. 5, in case a user desires to reserve content to be played back during an empty time period between 14:30 when 'movie 1' ends to 15:00 when 'sport 2' starts, the content management list providing apparatus searches content that may be played back for three minutes, which is between 14:30 and 15:00, aligns at least one searched content considering a user's predetermined standard (for example, content use history or preference, etc.), and then may display them in a pop-up window 510.

Referring back to FIG. 4, the content recommendation list searched in step 409 is displayed on a pop-up window, and if a user selects predetermined content desired to recording-reserve from the displayed content recommendation list, the selected information of content is displayed at a corresponding time (step 411). Here, the information of content may include the file name, file location, file size, playback time, and file type of the corresponding content.

Thereafter, the content management list providing apparatus determines whether an event occurs to indicate that an already reserved broadcast program or content is subject to cancelation (or deletion) of the reservation (step 413), and if the reservation cancellation event is determined to occur, deletes the corresponding reservation information from the content management list (step 415).

Further, the content management list providing apparatus determines whether an event occurs to indicate to terminate displaying the currently displayed content management list (step 417), and if it is determined that an event indicating to terminate displaying the content management list occurs, ends displaying the content management list (step 419).

In step 405 of FIG. 5, if it is determined that the reservation event is not for playback of content (that is, for view/recording reservation of a broadcast program), the content management list providing apparatus displays view or recording reservation of a broadcast program at a time selected by a user (step 421), followed by step 413 to perform a subsequent step.

Figure 6:
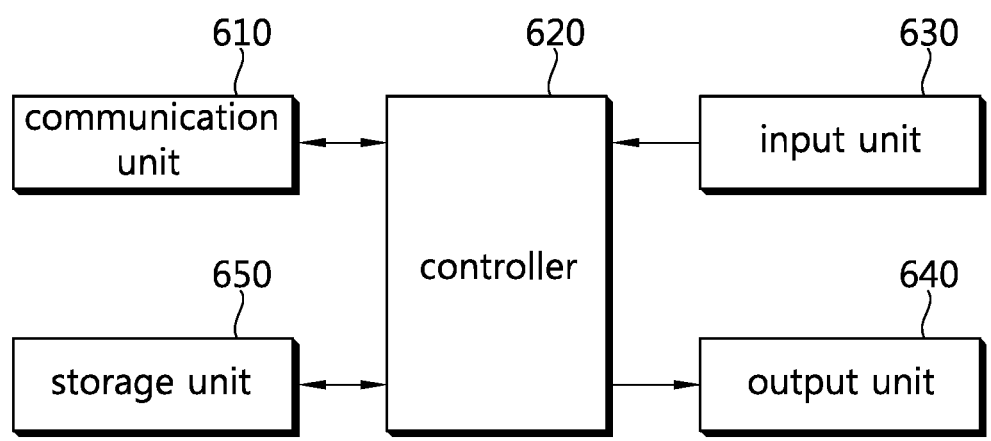
FIG. 6 is a block diagram illustrating the configuration of a content management list providing apparatus according to an embodiment of the present invention.

FIG. 6 is a block diagram illustrating the configuration of a content management list providing apparatus according to an embodiment of the present invention.

Referring to FIG. 6, the content management list providing apparatus according to an embodiment of the present invention may include a communication unit 610, a controller 620, an input unit 630, an output unit 640, and a storage unit 650.

The communication unit 610 may include a wired and/or wireless network interface, and receives an electronic program guide of digital broadcast, IPTV, or cable TV via a wired or wireless network and provides to the electronic program guide to the controller 620.

Further, the communication unit 610 receives a content file and/or information of the content file from various devices connected via a wired or wireless network under control of the controller 620 and then provides the received content file and/or information to the controller 620.

The controller 620 receives the electronic program guide information of digital terrestrial broadcast, IPTV broadcast or cable TV broadcast through the communication unit 610 and provides a content management list including electronic program guide information obtained corresponding to a key event signal provided from the input unit 630 to the output unit 640.

Further, the controller 620, when receiving a key event signal indicating view/recording of a broadcast program or a key event signal indicating a reservation for playback of predetermined content from the input unit 630, displays what is reserved on a display apparatus (not shown) through the output unit 640 corresponding to the reservation type, and stores what is reserved by a user. Here, in case the reservation event is related with playback of content, the controller 620 displays a content list present in various devices on an external display apparatus through the output unit 640 corresponding to a user's control command, and if the user selects reservation of specific content, obtains information of the selected content (e.g., content file name, file location, file size, playback time, file type, etc.) from the device where the content is stored, and then displays the type of the corresponding content as a separate time item having the same form as the electronic program guide as shown in FIG. 1, then displaying the information of reservation content at a corresponding reservation time of the displayed item.

Further, the controller 620 displays a user interface through the output unit 640. The user interface enables a user to select predetermined content and to arbitrarily select a playback reservation section of the whole playback section of the selected predetermined content thereby to reserve playback thereof. The controller 620 obtains playback start and/or playback end information of the reservation section arbitrarily selected by the user from the whole playback section of the content and displays the information at a corresponding time of the content management list.

Further, the controller 620, when a key event indicating cancellation (or deletion) of reservation of the already reserved broadcast program or content is provided from the input unit 630, deletes the corresponding reservation information from the content management list.

Still further, when the reservation event indicates view or recording of a broadcast program, the controller 620 displays view or recording-reservation on a broadcast program corresponding to a time selected by a user among the content management list displayed on an external display apparatus through the output unit 640 and stores it.

Further, the controller 620, in case the reservation event concerns playback of content, searches the optimal content at a reservation target time selected by a user in consideration of playback time of content, user's content use history, and user's content preference and aligns at least one searched content considering user's content use history or preference to generate a recommendation content list and displays the recommendation content list in a pop-up window. Thereafter, the controller 620, when a user selects predetermined content desired to be playback-reserved from the recommendation content list with the user displayed thereon, displays the selected information of content at a corresponding time of the content management list displayed on the display apparatus through the output unit 640. Here, the controller 620 receives a content list through various apparatuses connected through the communication unit 610 and searches the received content list to generate a recommendation content list or may directly search content stored in various apparatuses connected via the communication unit 610, thereby generating a recommendation content list.

The input unit 630 may include at least one key or may include an RF, infrared, or Bluetooth module for receiving a control signal from a remote controller and provides the controller 620 with an event signal corresponding to a key control signal provided by a user's key manipulation.

The output unit 640 may include an image processing module and/or a sound output module for controlling the display apparatus, and may process an image signal under control of the controller 620 and provides it to a display apparatus connected thereto.

The storage unit 650 stores an electronic program guide and user's selected broadcast program and/or content reservation information under control of the controller 620. Or, the storage unit 650 may store a content file and/or information of content under control of the controller 620.

Although embodiments of the present invention have been described, it may be understood by those skilled in the art that various modifications or variations may be made to the present invention without departing from the scope of the present invention.

The invention claimed is:

1. A method of providing a content management list of a content management list providing apparatus configured to access a plurality of contents through a network, the method comprising:

displaying, by an image processor of the content management list providing apparatus, a content management list including electronic program guide information of a broadcast program;

displaying, by the image processor, information of a playback reservation content corresponding to an event signal indicating a content playback reservation at a corresponding reservation time of a time axis separately displayed on the content management list;

identifying a length of a playback reservation section for a reserved content or program;

automatically designating a start time and end time of the playback reservation section of a whole playback section of a content corresponding to the event signal to avoid conflict with the reserved content or program, wherein the start time and the end time of the playback reservation section corresponds to a width of a reservable time of the content management list;

splitting the playback reservation section of the content corresponding to the event signal into different reserved sections of the content management list; and displaying the different reserved sections of the split playback reservation section, wherein on a content management list display screen, a predetermined content that is selected by the event signal is distinguished from other programs at a time corresponding to a reservation time of the predetermined content by graphic and text, wherein when the content management list is displayed, a first command tool that includes playback, view or recording reservation of the predetermined content and a second command tool that deletes or cancels the reserved content or program are always displayed outside of the content management list together with the content management list on a single screen, and wherein when the screen overflows with information displayed on the content management list, a vertical and/or horizontal scroll tool is automatically displayed.

2. The method of claim 1, wherein the displaying, by the image processor, the information of playback reservation content at the corresponding reservation time of the time axis separately displayed on the content management list comprises:
   obtaining the information of playback reservation content corresponding to the event signal indicating the content playback reservation; and
   displaying the obtained information of playback reservation content at the reservation time.

3. The method of claim 1, wherein the information of playback reservation content includes at least one of a file name, a file location, a file size, a playback time, and a file type.

4. The method of claim 1, wherein displaying, by the image processor, the information of playback reservation content at the corresponding time of the time axis separately displayed on the content management list comprises:
   selecting the predetermined content by a user and providing a user interface that enables the user to arbitrarily select a playback section of the whole playback section of the selected predetermined content; and
   obtaining information on the playback section selected by the use and displaying the obtained information at the corresponding time.

5. The method of claim 1, wherein the content management list, in case there are a plurality of playback-reserved contents, separates each of a plurality of playback-reserved contents into each type, displays each separated content type as a separate time axis item having the same form as the electronic program guide, and then displaying corresponding content reservation information at a corresponding reservation time of each time axis item.

6. The method of claim 1, wherein the displaying, by the image processor, the information of playback reservation content corresponding to the event signal indicating the content playback reservation at the corresponding reservation time of the time axis separately displayed on the content management list comprises:
   generating a content recommendation list based on searching at least one content that may be played back at the reservation time corresponding to the event signal indicating the content playback reservation;
   displaying the generated content recommendation list; and
   displaying information of the predetermined playback reservation content selected by the user in the displayed content recommendation list at the corresponding reservation time of the time axis separately displayed on the content management list.

7. The method of claim 6, wherein generating the content recommendation list comprises:
   searching at least one content based on at least one of a content playback time, a user's content use history, and a user's content preference; and
   aligning the searched at least one content according to a predetermined standard.

8. The method of claim 1, wherein the content management list displays playback reservation information on at least one content of a content stored in the content management list providing apparatus, a content stored in each of at least one apparatuses connected to the content management list providing apparatus via a network, a content connected through a Digital Living Network Alliance (DLNA), and a content that may be played through the Internet.

9. An apparatus of providing a content management list, the apparatus comprising:
   a communication unit configured to receive electronic program guide information and information of content via a wired or wireless network;
   an input unit configured to provide an event signal corresponding to a key control signal provided by a user's key manipulation;
   a controller configured to display a content management list including the electronic program guide information and information of a playback reservation content corresponding to an event signal indicating a content playback reservation provided from the input unit at a corresponding reservation time of a time axis separately displayed on the content management list; and
   an output unit configured to output display information of the content management list under control of the controller,
   wherein the controller is further configured to:
      identify a length of a playback reservation section of a reserved content or program,
      automatically designate a start time and end time of the playback reservation section of a whole playback section of a content corresponding to the event signal to avoid conflict with the reserved content or program,
      wherein the start time and the end time of the playback reservation section corresponds to a width of a reservable time of the content management list,
      split the playback reservation section of the content corresponding to the event signal into different reserved sections of the content management list, and
      control the output unit to include the different reserved sections of the split playback reservation section in the output display information of the content management list,
   wherein on a content management list display screen, a predetermined content that is selected by the event signal is distinguished from other programs at a time corresponding to a reservation time of the predetermined content by graphic and text,
   wherein when the content management list is displayed, a first command tool that includes playback, view or recording reservation of the predetermined content and a second command tool that deletes or cancels the reserved content or program are always displayed outside of the content management list together with the content management list on a single screen, and
   wherein when the screen overflows with information displayed on the content management list, a vertical and/or horizontal scroll tool is automatically displayed.

10. The apparatus of claim 9, wherein the controller obtains the information of playback reservation content corresponding to the event signal indicating the content playback reservation through the communication unit and displays the obtained information of playback reservation content at a corresponding reservation time of the time axis separately displayed on the content management list.

11. The apparatus of claim 9, wherein the controller, in case there are a plurality of playback-reserved contents, separates each of a plurality of playback-reserved contents into each type, displays each separated content type as a separate item having the same form as the electronic program guide, and then displaying corresponding content reservation information at a corresponding reservation time of each item.

12. The apparatus of claim 9, wherein the controller searches at least one content that may be played back at the reservation time corresponding to the event signal indicating the content playback reservation to generate a content recommendation list, displays the generated content recommendation list and displays information of the predetermined playback reservation content selected by the user in the displayed content recommendation list at the corresponding reservation time of the time axis separately displayed on the content management list.

13. The apparatus of claim 12, wherein the controller generates the content recommendation list by searching a content based on at least one of a content playback time, a user's content use history, and a user's content preference and aligning the searched at least one content according to a predetermined standard.

14. The apparatus of claim 9, wherein the content management list displays playback reservation information on at least one content of a content stored in the content management list providing apparatus, a content stored in each of at least one apparatuses connected to the content management list providing apparatus via a network, a content connected through a Digital Living Network Alliance (DLNA), and a content that may be played through the Internet.

15. The apparatus of claim 9, wherein the controller displays a user interface through the output unit, the user interface enabling a user to select the predetermined content and to arbitrarily select a user's playback section from a whole playback section of the selected predetermined content to reserve playback, and obtains the user's selected playback section information and displays the obtained information at a corresponding time of the content management list.

* * * * *